United States Patent [19]

Okuda et al.

[11] Patent Number: 4,804,823
[45] Date of Patent: Feb. 14, 1989

[54] CERAMIC HEATER

[75] Inventors: Norio Okuda, Kokubu; Noriyoshi Nakanishi, Hayato; Masahiro Yamamoto, Kokubu; Shinsuke Takenishi, Kokubu; Kenichiro Miyahara, Kokubu; Hiroaki Sonoda, Kagoshima; Masanobu Ishida, Kokubu, all of Japan

[73] Assignee: Kyocera Corporation, Kyoto, Japan

[21] Appl. No.: 79,255

[22] Filed: Jul. 29, 1987

[30] Foreign Application Priority Data

Jul. 31, 1986 [JP] Japan .............................. 61-181507
Sep. 25, 1986 [JP] Japan .............................. 61-227755
Nov. 27, 1986 [JP] Japan .............................. 61-283390
Nov. 29, 1986 [JP] Japan .............................. 61-285259
Feb. 27, 1987 [JP] Japan .............................. 62-46585

[51] Int. Cl.⁴ .............................................. H05B 3/10
[52] U.S. Cl. .................................. 219/553; 219/541; 219/552; 338/306
[58] Field of Search .............................. 338/306–314, 338/330–334, 220–225; 219/541, 552, 553

[56] References Cited

U.S. PATENT DOCUMENTS 4,449,039  5/1984  Fukazawa et al. ............. 338/330 X
4,453,397  6/1984  Ohta et al. ..................... 338/34 X
4,652,727  3/1987  Hoshizaki et al. .................. 219/541
4,671,058  6/1987  Yoshida et al. ................. 338/330 X
4,697,165  9/1987  Ishiguro et al. ................. 219/541 X Primary Examiner—E. A. Goldberg
Assistant Examiner—M. M. Lateef
Attorney, Agent, or Firm—Spensley Horn Jubas & Lubitz

[57] ABSTRACT

A ceramic heater having a ceramic substrate, a heat-generating resistor disposed in the interior of the ceramic substrate or on the surface of the ceramic substrate and terminals connected to both the ends of the heat-generating resistor, wherein the ceramic substrate is composed of a sintered body of a nitride of an element selected from the group consisting of silicon and aluminum and the heat-generating resistor is composed of a ceramic layer containing titanium nitride (TiN) or tungsten carbide (WC).

16 Claims, 7 Drawing Sheets

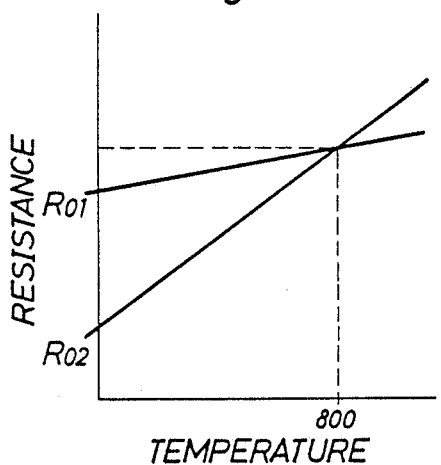
Fig. 1-A
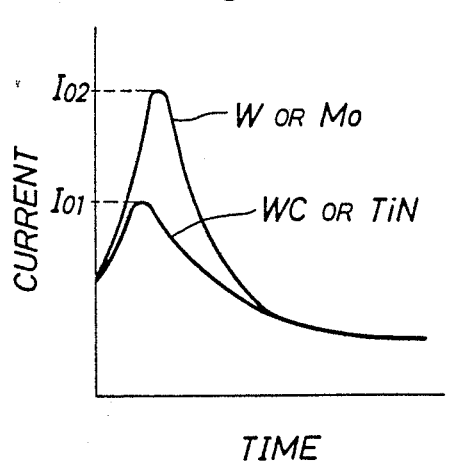
Fig. 1-B
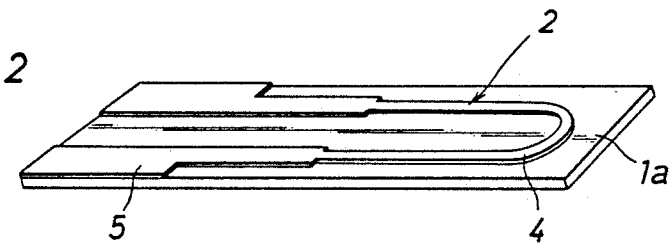
Fig. 2
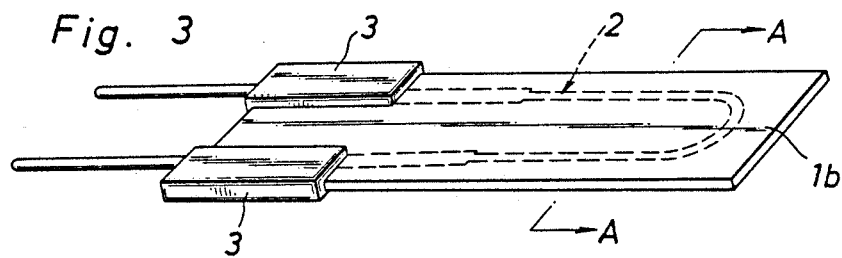
Fig. 3
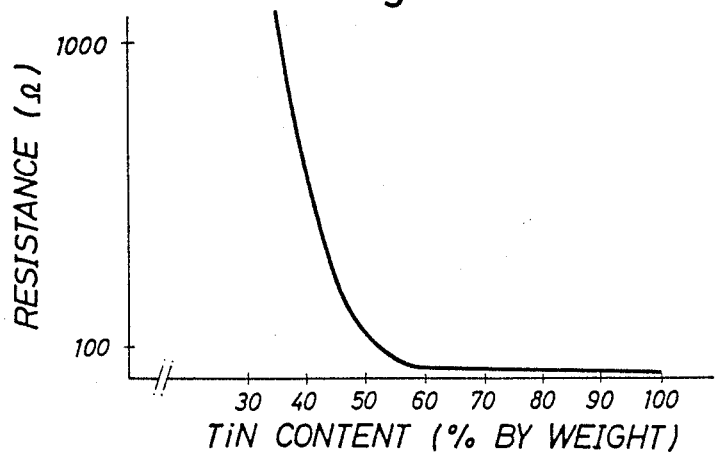
Fig. 4

CERAMIC HEATER

BACKGROUND OF THE INVENTION (1) Field of the Invention

The present invention relates to a ceramic heater excellent in the thermal shock resistance and the strength at high temperatures, which can be widely used for ordinary houses, electronic parts, industrial equipments and automobiles.

(2) Description of the Prior Art

As the heater comprising a ceramic material as the substrate, there has been mainly used a heater comprising a resistor composed mainly of a metal such as tungsten (W) or molybdenum (Mo), which is in an alumina ($Al_2O_3$) sintered body.

This ceramic heater is advantageous in that it is excellent in the electrically insulating property chemical resistance and abrasion resistance. However, alumina is poor in the thermal shock resistance and the strength at high temperatures. Namely, the thermal shock-resistant temperature difference is about 200° C. when thrown in water and quenched, and the strength at high temperatures of up to 800° C. is about 30 kg/mm$^2$ as determined by the 4-point bending flexural strength method.

Accordingly, use of a silicon nitride sintered body, which is excellent over other ceramics in the thermal shock resistance and the strength at high temperatures, as the substrate of a heater has attracted attention in the art. This silicon nitride sintered body is superior to alumina in that the thermal shock-resistant temperature difference is about 600° C. and the strength at high temperatures of up to 800° C. (4-point bending flexural strength) is 60 kg/mm$^2$.

A ceramic heater comprising this silicon nitride sintered body as the substrate, in which a heat-generating resistor metal such as tungsten (W) or molybdenum (Mo) is embedded as in case of the alumina, has already been proposed, and a heater formed by printing a heat-generating resistor paste composed of such a metal as tungsten (W) or molybdenum (Mo) on a silicon nitride green sheet, laminating the green sheet on the printed sheets and sintering the laminate integrally is proposed in Japanese Patent Application Laid-Open No. 55-126989.

However, when a metal such as tungsten (W) or molybdenum (Mo) is used as the heat-generating resistor, at sintering at high temperatures or during long-time application where elevation and dropping of the temperature are repeated, the metal such as tungsten (W) or molybdenum (Mo) reacts with silicon nitride ($Si_3N_4$) in the interface between the periphery of the heat-generating resistor and silicon nitride and a layer of $WSi_2$ or $MoSi_2$ is readily formed. Furthermore, a layer of $WO_3$ or $MoO_3$ is readily formed by reaction with oxygen. Since the so-formed reaction layers are physically brittle, the dispersion of the resistance value is large, and especially in case of a high-resistance heater, cracks are readily formed in the interface where the reaction layers are formed and breaking of the heat-generating resistor is caused. Because of these defects, the conventional heaters, especially the heaters formed by using a heat-generating resistor paste, are hardly put into practical use. A heat-generating resistor composed of a metal such as tungsten (W) or molybdenum (Mo) has a relatively high resistance temperature coefficient (TCR) of about $4 \times 10^{-3}$ to about $5 \times 10^{-3}$ (0° to 800° C.). Accordingly, even in the practically used heater having a heat-generating resistor metal such as tungsten (W) or molybdenum (Mo) embedded in the substrate, the inrush current is increased at the time of application of the voltage, and an electricity control apparatus in which the current capacity is large is necessary for the heater. In a heat-generating resistor composed of a metal such as tungsten (W) or molybdenum (Mo), the change of the resistance according to the temperature is not linear and the temperature is not constantly elevated with rise of the voltage. Accordingly, it is difficult to perform the temperature control by detecting the resistance value.

SUMMARY OF THE INVENTION

It is a primary object of the present invention to provide a ceramic heater excellent in the thermal shock resistance, in which dispersion of the resistance of the heat-generating resistor or breaking of the heat-generating resistor is not caused, the change ratio (TCR) of the resistance according to the temperature is low and the change of the resistance is linear.

Another object of the present invention is to provide a ceramic heater in which the temperature at the generation of heat is reduced in a terminal-attaching portion and the strength durability of this portion is increased.

In accordance with the aspect of the present invention, there is provided a ceramic heater comprising a ceramic substrate, a heat-generating resistor disposed in the interior of the ceramic substrate or on the surface of the ceramic substrate and terminals connected to both the ends of the heat-generating resistor, wherein the ceramic substrate is composed of a sintered body of a nitride of an element selected from the group consisting of silicon and aluminum and the heat-generating resistor is composed of a ceramic layer containing titanium nitride (TiN) or tungsten carbide (WC).

In accordance with another aspect of the present invention, there is provided a ceramic heater comprising a ceramic substrate, a heat-generating resistor disposed in the interior of the ceramic substrate or on the surface of the ceramic substrate and terminals connected to both the ends of the heat-generating resistor, wherein the ceramic substrate is composed of a sintered body of a nitride of an element selected from the group consisting of silicon and aluminum, the heat generating resistor comprises terminal-attaching portions having a large sectional area and a heat-generating intermediate portion having a small sectional area, which is located between the terminal-attaching portions, the terminal-attaching portions are composed of a ceramic layer containing tungsten carbide, and the heat-generating intermediate portion is composed of a ceramic layer containing titanium nitride.

BRIEF DESCRIPTION OF THE DRAWINGS

FIG. 1-A is a graph illustrating the temperature dependency of the resistance in various resistors.

FIG. 1-B is a graph illustrating the relation between the time and the current at the current inrush in the resistors shown in FIG. 1-A.

FIG. 2 is a perspective view illustrating the state where a heat-generating resistor layer of the present invention is formed on a ceramic substrate.

FIG. 3 is a perspective view of a complete ceramic heater obtained by forming a ceramic covering on the heat-generating resistor layer shown in FIG. 2.

FIG. 4 is a graph illustrating the relation between the content of TiN in the TiN resistor layer and the resistance.

DETAILED DESCRIPTION OF THE PREFERRED EMBODIMENTS

Figure 5:
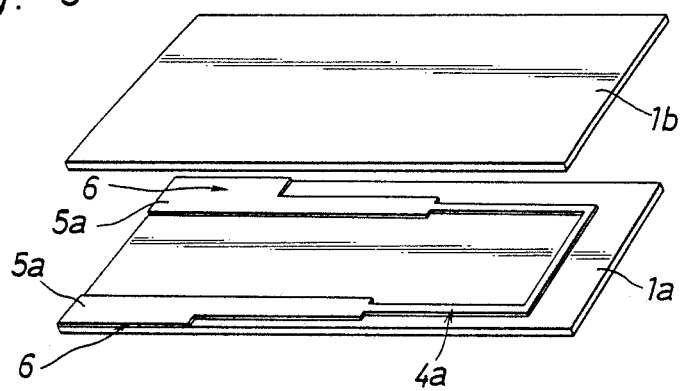
FIG. 5 is a perspective view illustrating in the exploded state the laminate structure in another embodiment of the ceramic heater of the present invention.

In the ceramic heater of the present invention, tungsten carbide (WC) or titanium nitride (TiN) used as the heat-generating resistor is thermodynamically more stable at high temperatures than the single element such as tungsten (W) or molybdenum (Mo), and a brittle reaction layer is hardly formed by the reaction with the ceramic substrate. Accordingly, breaking or embrittlement of the resistor by the presence of the brittle reaction layer is substantially completely prevented.

Furthermore, the resistance is hardly changed at the sintering step or by long-time repetition of the elevation and dropping of the temperature. Moreover, since the thermal expansion coefficient of tungsten carbide (WC) as the heat-generating resistor is close to that of silicon nitride ($Si_3N_4$) as the substrate, peeling is not caused between them when elevation and dropping of the temperature are repeated, and a tough heat-generating resistor can be formed. Similarly, as is apparent from the fact that titanium nitride (TiN) as the heat-generating resistor can act as a sintering aid for silicon nitride ($Si_3N_4$) as the substrate, TiN and $Si_3N_4$ are tightly bonded to each other, and a ceramic heater excellent in the peeling resistance and thermal shock resistance can be formed.

The heat-generating resistor composed of tungsten carbide (WC) or titanium nitride (TiN) is characterized in that the resistance temperature coefficient (TCR) is $1 \times 10^{-3}$ to $2 \times 10^{-3}$ (temperature range of 0° to 800° C.) and much smaller than that of a heat-generating resistor composed of tungsten (W) or molybdenum (Mo).

More specifically, as shown in FIGS. 1-A and 1-B, when heaters of the same wattage, that is, a heater $R_{o1}$ comprising WC or TiN as the resistor and a heater $R_{o2}$ comprising tungsten (W) or molybdenum (Mo), are prepared (see FIG. 1-A with respect to the case where the resistance at 800° C. is the same), since the heater comprising tungsten (W) or molybdenum (Mo) as the resistor has a small resistance at room temperature, the inrush current at the time of application of the voltage is increased according to the general formula of $V = IR$ (see FIG. 1-B).

On the other hand, since the resistance at room temperature of the heater comprising tungsten carbide (WC) or titanium nitride (TiN) as the resistor is large, the inrush current at the time of application of the voltage can be reduced and the current capacity of the control apparatus for the heater can be reduced. Moreover, if the resistance temperature coefficient (TCR) is small, the temperature distribution is uniformalized in the heater irrespectively of the atmosphere where the heater is used.

More specifically, since the relation of $W = I^2R$ (I is a constant) is established according to Ohm's law, it is known that the heat-generating energy is increased proportionally to the resistance value. Accordingly, when a part of a heater having a large resistance temperature coefficient (TCR) is locally cooled, the resistance of the resistor at this part is drastically reduced and the quantity of heat generated at this part is drastically reduced. On the other hand, in case of the heater of the present invention having a small resistance temperature coefficient (TCR), even if a part of the heater is locally cooled, the resistance of the resistor at this part is not so reduced and the change of the quantity of heat generated at this part is small. Namely, the temperature distribution of the heater hardly undergoes an external influence.

It was experimentally confirmed that in the heat-generating resistor composed of tungsten carbide (WC) or titanium nitride (TiN) according to the present invention, the change of the resistance according to the temperature is substantially linear.

For the production of the ceramic heater, as shown in FIG. 2, a paste layer containing tungsten carbide or titanium nitride is patterned by screen printing or the like on a green ceramic sheet $1a$ to be converted to an insulator by sintering, which is obtained by press molding or tape formation of a nitride of silicon or aluminum, whereby a resistance circuit 2 is formed. A green ceramic sheet $1b$ (see FIGS. 3 and 5) similar to the above-mentioned green sheet is laminated on this paste layer 2 and the laminate is integrally sintered. The sintered body is subjected to the grinding or surface treatment to expose electrode-attaching portions 6 (see FIG. 5), and terminals 3 are attached thereto, as shown in FIG. 3, if necessary through a metallized layer (not shown), whereby a plate-shaped ceramic heater is fabricated.

In the present invention, in order to obtain desired generation of heat while maintaining the temperature of the terminal or a surrounding portion thereof, it is preferred that the heat-generating resistor layer 2 should comprise terminal-attaching portions 5 having a large sectional area and a heat-generating intermediate portion 4 having a small sectional area, which is located between the terminal-attaching portions 5, as clearly shown in FIG. 2.

It is preferred that the thickness of the heat-generating resistor layer be smaller than 3 mm, especially smaller than 2 mm. It is generally recommended that the thickness of the heat-generating resistor layer be 1 to 100 μm, especially 3 to 40 μm. It is preferred that the thickness of the substrate of silicon nitride or aluminum nitride after sintering be 0.1 to 30 mm, especially 0.5 to 10 mm. The sectional area and length of the heat-generating resistor layer are changed according to the desired resistance value, the electric input and the like. It is preferred that the resistance of the heat-generating resistor layer as a whole be 0.1 to 1000Ω, especially 1 to 500Ω, and the quantity of generated heat be 5 to 3000 W, especially 20 to 2000 W. Furthermore, it is preferred that the sectional area of the terminal-attaching portion 5 be 1.5 to 100 times, especially 2 to 60 times, as large as the sectional area of the heat-generating intermediate portion.

In accordance with one preferred embodiment of the present invention, the ceramic substrate 1a, 1b is composed of a silicon nitride ($Si_3N_4$) sintered body, and the heat-generating resistor layer 2 is composed of a ceramic layer containing titanium nitride (TiN). In this embodiment, the silicon nitride sintered body is excellent in the thermal shock resistance and the strength at high temperatures over other ceramics, and the thermal shock resistance temperature difference of this silicon nitride sintered body is about 600° C. and the strength at high temperatures (4-point bonding flexural strength) is 60 kg/mm² and higher than that of alumina. As pointed out hereinbefore, the heat-generating resistor layer of titanium nitride is excellent in the adhesion to the $Si_3N_4$ substrate. The heat-generating generator layer containing TiN is formed of a sintered body of (a) titanium nitride, (b) silicon nitride and (c) a sintering aid. As the sintering aid (c), there are used yttria, magnesia and alumina. An especially preferred example of the ceramic composition comprises 40 to 85% by weight of titanium nitride, 20 to 54% by weight of silicon nitride and 1 to 10% by weight of the sintering aid.

Namely, $Si_3N_4$ and other component in the TiN resistor paste improve the sintering property of the paste and exert the function of increasing the bonding force between the $Si_3N_4$ substrate and the resistor. However, if the amounts of components other than TiN are too large, the resistance change ratio is increased. If the TiN content in the paste exceeds 85% by weight, the sintering property is degraded, and if the TiN content is lower than 40% by weight, the resistor change ratio per the TiN content is too large, as shown in FIG. 4, and control of the resistance value becomes difficult.

Another preferred example of the TiN resistor paste used in the present invention comprises 20 to 70% by weight, especially 25° to 55% by weight, of $Si_3N_4$, 30 to 75% by weight, especially 42 to 72% by weight, of TiN and 0.1 to 9% by weight of MgO or a compound to be converted to MgO under sintering conditions.

Namely, MgO acts as the sintering aid for titanium nitride (TiN) and promotes densification. Accordingly, the change of the resistance by formation of voids or cracks is controlled, and as the result, a good linearity is obtained in the resistance temperature coefficient (TCR). If the amount of $Si_3N_4$ is smaller than 20% by weight and the TiN content exceeds 75% by weight, the thermal expansion coefficient of the heat-generating resistor composed mainly of TiN is much larger than that of the $Si_3N_4$ substrate, and the thermal stress is imposed at the time of generation of heat and cracks are readily formed in the resistor. Moreover, since the content of the $Si_3N_4$ is reduced, the strength of the resistor per se is reduced. On the other hand, if the content of $Si_3N_4$ exceeds 70% by weight and the TiN content is lower than 30% by weight, the insulating property and the resistance value is increased because of the low content of TiN, and the sintered body cannot be used as a heat-generating resistor. Moreover, if the TiN content is low, the resistance value is greatly changed by a slight change of the ratio between TiN and $Si_3N_4$, and therefore, control of the resistance value and maintenance of a stabilized resistance value become difficult. If the MgO content is lower than 0.1% by weight, since sintering is not sufficiently promoted in the resistor, the strength is reduced and cracks are readily formed. Therefore, the linearity is lost in the resistance temperature coefficient and the resistance is readily changed. If the MgO content exceeds 9% by weight, the content of the vitreous component in the resistor is increased and the strength is rather reduced. Accordingly, cracks are readily formed in the resistor, and the linearity is lost in the resistance temperature coefficient and the resistance value si readily changed.

In accordance with another preferred embodiment of the present invention, the heat-generating resistor layer is a sintered body of a composition comprising titanium nitride and 0.05 to 8% by weight, based on titanium nitride, of silicon carbide, this sintered body has a chemical structure in which at least a part of SiC is solid-dissolved in the TiN lattice, and this sintered body has a density of at least 4.2 g/cm³ and a specific resistance smaller than 40 μΩ-cm.

In this embodiment, if the amount added of SiC is smaller than 0.05% by weight based on TiN as the main component, no substantial effect is attained by addition of SiC, and the specific resistance is not significantly reduced but the density is reduced. If the amount added of SiC exceeds 8% by weight based on TiN, the specific resistance is abruptly increased and the density is drastically reduced. In case of a sintered body composed solely of TiN, which is formed without addition of SiC, a Ti phase often appears in addition to the TiN phase. When the amount of SiC added to TiN is gradually increased, an α-SiC phase is precipitated if the amount added of SiC exceeds about 10% by weight. If the amount added of SiC is in the range of from 0.05 to 8% by weight, SiC is solid-dissolved in the TiN lattice, and in the state of this solid solution, the specific resistance is lower than 40 μΩ-cm and the sintered body is densified so that the density is at least 4.2 g/cm³.

In accordance with still another embodiment of the present invention, the ceramic substrate 1a, 1b is composed of a sintered body of aluminum nitride and the heat-generating resistor layer 2 is composed of a ceramic layer containing titanium nitride. In this embodiment, TiN and AlN are tightly bonded to each other, but embrittlement or breaking of the resistor layer is effectively prevented by mutual reaction between them. The above-mentioned TiN compositions can be similarly used for the resistor layer.

In accordance with still another embodiment of the present invention, the ceramic substrate is composed of a sintered body of silicon nitride and the heat-generating resistor is composed of a tungsten carbide layer. The heat-generating resistor layer of WC is prepared, for example, by sintering a paste containing WC alone. In the examples of the present invention, the heat-generating resistor paste comprising substantially pure WC, that is, WC having a purity of 99.8%, was used. However, in order to adjust the resistance value of the heat-generating resistor, improve the denseness of the resistor or enhance the bondability to the silicon nitride substrate, up to about 40% by weight of a single substrate, oxide, nitride, carbide or carbonitride of an element of the group IIIA such as Y or an element of the group IIa such as Mg, or the same Si₃N₄ as that of the silicon nitride substrate, may be added to WC. If such an additive is incorporated, the effects of the present invention are not degraded.

In accordance with still another embodiment of the present invention, the terminal-attaching portion having a large sectional area is formed of a ceramic material composed mainly of WC, and the heat-generating intermediate portion having a small sectional area is formed of a TiN-containing ceramic material.

Figure 6:
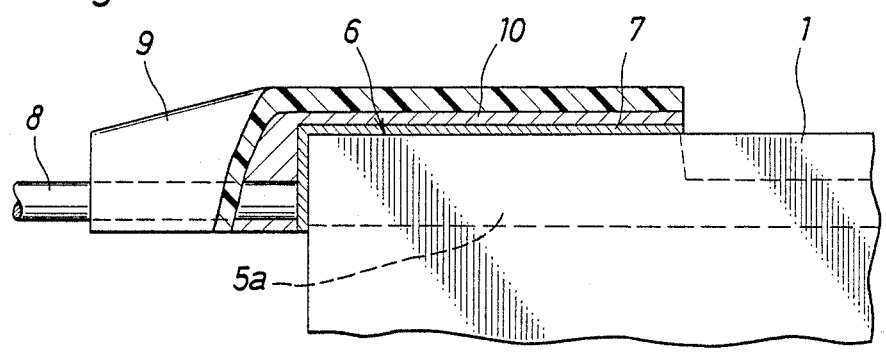
FIG. 6 is an enlarged sectional view illustrating the state where a terminal is attached to a terminal-attaching exposed portion of the ceramic heater shown in FIG. 5.

Referring to FIGS. 5 and 6 illustrating this embodiment, a terminal-attaching portion 5a having a large sectional area is formed of a ceramic composed mainly of MC, and a heat-generating intermediate portion 4a having a small sectional area is formed of a ceramic material containing TiN. The terminal-attaching portion 5a having a large sectional area has a portion 6 exposed to both the ends of the laminate, and a metallized layer composed of a mixture of a glass and a powder of Ni is formed on this exposed portion 6, as shown in FIG. 6. A metal cap 9 for fixing an electrode lead line 8 is secured on the metallized layer 7 through a silver solder 10.

If this structure is adopted, generation of heat is controlled in the terminal-attaching portion 5a, and the strength of the bonded portion can be stably maintained without degradation even if the heater is used over a long period.

Since the melting points of the metallized layer 7 and silver solder 10 for bonding the metal cap 9 to the exposed surface 6 of the terminal-attaching portion 5a are generally 600° to 850° C., it is preferred that the terminal-attaching portion 5a be maintained at a temperature much lower than the above-mentioned temperature even when an electric current is supplied to the heater. The specific resistance of TiN used for the heat-generating intermediate portion 4a in the present invention is relatively high and about 400 $\mu\Omega$-cm. Accordingly, if the temperature of the heat-generating intermediate portion 4a is elevated to an allowable highest level of about 1300° C., the temperature of the terminal-attaching portion 5a is likely to rise to about 500° C. to about 700° C. If the terminal-attaching portion 5a is formed of WC having a relatively low specific resistance of 100 $\mu\Omega$-cm according to this embodiment, the heat-generating temperature of the terminal-attaching portion 5a can be controlled to a level lower than 300° C., and degradation of the strength of the bonded portion can be prevented.

A silicon nitride sintered body or aluminum nitride sintered body that is used as the substrate in the present invention can be prepared by optional known means. For example, the silicon nitride is formed by adding an oxide, nitride or oxynitride of an element of the group IIa or IIIa of the Periodic Table or Al as the sintering aid to silicon nitride powder, molding the mixture and sintering the molded body at 1600° to 2200° C. in a nitrogen atmosphere according to the pressureless sintering method, the hot pressing method or the gas pressure sintering method. The aluminum nitride sintered body can be obtained by using a sintering aid as described above and carrying out sintering at 1600° to 2000° C. in a nitrogen atmosphere according to the sintering method described above.

The present invention will now be described in detail with reference to the following examples that by no means limit the scope of the invention.

EXAMPLE 1

Additives such as Si₃N₄, Y₂O₃, MgO and Al₂O₃ were added in amounts shown in Table 1 to titanium nitride (TiN). Then, acetone and a binder were added to the mixture, and the mixture was blended by a shaking mill for 72 hours. Acetone was removed from the mixture, and the residue was kneaded and the viscosity was adjusted to form a paste for a heat-generating resistor. Each paste of samples Nos. 1 through 10 shown in Table 1 was subjected to a press-molding or tape-forming operation to form a green silicon nitride formed body 1a to be rendered electrically insulating by sintering. As shown in FIG. 2, a resistance circuit 2 was formed on the formed body 1a by screen printing, and another green formed body was laminated on the so-formed sheet and the laminate was integrally sintered according to any of the pressureless sintering method (PL), the gas pressure sintering method and the hot pressing method. The sintered body was subjected to a grinding or surface treatment to expose electrodes. Electrode-attaching fittings 3 were soldered to the electrodes through a metallized layer to obtain a plate-shaped ceramic heater of 70 mm×5 mm×1.2 mm as shown in FIG. 3.

A voltage (100 to 120 V) which would raise the temperature of the top end of the heat-generating resistor to 900° C. by 5 seconds' application was applied to each of the plate-shaped ceramic heaters corresponding to samples Nos. 1 through 10 for 5 seconds, and the ceramic heater was forcibly cooled in air for 13 seconds. This operation was regarded as one cycle, and the initial resistance value and the resistance value after 20,000 cycles were measured and the resistance change ratio was examined. During the production of each ceramic heater, the thickness of the heat-generating resistor at the paste-printing step was measured by a film thickness meter. The obtained results are shown in Table 1.

Similarly, a resistor paste of W or Mo was printed on the surface of the green silicon nitride formed body to form a resistance circuit, and so-prepared sheets were laminated as described above and integrally sintered under atmospheric pressure to form a ceramic heater as shown in FIG. 3. The initial resistance value and the resistance value after 20,000 cycles were measured and the resistance change ratio was examined. The obtained results (comparative samples) are shown in Table 2.

TABLE 1

| Sample No. | Heat-Generating Resistor Paste (% by weight) | | | | Sintering Method | Heat Cycle Test | | | Thickness ($\mu$m) of Resistor |
|---|---|---|---|---|---|---|---|---|---|
| | TiN | Si₃N₄ | additives | | | initial value ($\Omega$) | after 20,000 cycles ($\Omega$) | change ratio (%) | |
| 1 | 36.2 | 60.7 | Y₂O₃ MgO | 2.4 0.7 | HP | 1000 | 998 | 0.2 | 13 |
| 2 | 53.1 | 44.5 | Y₂O₃ MgO | 1.9 0.5 | HP | 80 | 81 | 1.3 | 14 |
| 3 | 53.1 | 40.8 | Al₂O₃ Y₂O₃ | 4.1 2.0 | HP | 78 | 79 | 1.3 | 13 |
| 4 | 53.1 | 44.5 | Al₂O₃ | 1.9 | GPS | 150 | 152 | 1.3 | 12 |

TABLE 1-continued

| Sample No. | Heat-Generating Resistor Paste (% by weight) TiN | $Si_3N_4$ | additives | | Sintering Method | Heat Cycle Test initial value (Ω) | after 20,000 cycles (Ω) | change ratio (%) | Thickness (μm) of Resistor |
|---|---|---|---|---|---|---|---|---|---|
| | | | $Y_2O_3$ | 0.5 | | | | | |
| 5 | 53.1 | 29.2 | $Y_2O_3$ | 9.2 | HP | 75 | 77 | 2.6 | 15 |
| | | | MgO | 8.5 | | | | | |
| 6 | 53.1 | 44.5 | $Y_2O_3$ | 1.9 | PL | 400 | 399 | 0.3 | 13 |
| | | | MgO | 0.5 | | | | | |
| 7 | 53.1 | 20.7 | $Y_2O_3$ | 15.2 | HP | 78 | 85 | 6.3 | 13 |
| | | | MgO | 11.0 | | | | | |
| 8 | 53.1 | 46.9 | | — | HP | 79 | 82 | 3.8 | 14 |
| 9 | 94 | 2.6 | $Y_2O_3$ | 2.8 | HP | 40 | 41.6 | 4.0 | 12 |
| | | | MgO | 0.6 | | | | | |
| 10 | 100 | — | | — | HP | 35 | 40.3 | 15.5 | 11 |

TABLE 2

| Comparative Sample No. | Heat-generating Resistor Paste | Sintering Method | Heat Cycle Test initial value (Ω) | after 20,000 cycles (Ω) | change ratio (%) |
|---|---|---|---|---|---|
| 1 | Mo | PL | 105 | breaking | — |
| 2 | W | PL | 130 | 190 | 46.1 |

As is understood from the results shown in Table 1 and 2, in case of the heat-generating resistor formed by using W or Mo, the change of the resistance after 20,000 cycles of the cycle test is large or breaking is caused. On the other hand, in the ceramic heater formed by sintering a heat-generating resistor paste containing TiN, the change of the resistance value after 20,000 cycles of the cycle test is extremely small. It is considered that the reason is that a brittle reaction layer as described above is not formed in the interface between the resistor and silicon nitride.

From the results shown in Table 1, it is understood that the resistance change ratio in samples Nos. 1 through 7 and 9 formed by adding $Si_3N_4$ and other additives ($Y_2O_3$, MgO and $Al_2O_3$) to TiN is smaller than the resistance change ratio in sample No. 10 formed without adding $Si_3N_4$ and other additives or sample No. 8 formed without adding only additives. It is considered that the reason is that $Si_3N_4$ and other additives described above in the TiN resistor paste improve the sintering property at the sintering step and the force of bonding of the resistor to the substrate by diffusion into the substrate. However, if other additives ($Y_2O_3$, MgO and $Al_2O_3$) are added in too large amounts as in sample No. 7, the resistance change ratio is increased. Accordingly, it is preferred that the amount added of other additives be 1 to 20% by weight, especially 1 to 10% by weight. Since the sintering property is degraded if TiN is incorporated in too large an amount, it is preferred that the amount of TiN be up to 85% by weight, and if the amount of TiN is too small (for example, smaller than 40% by weight), the change of the resistance value according to the TiN content is too large as shown in FIG. 4, control for deciding the resistance value becomes difficult.

In view of the amounts of TiN and other additives, it is preferred that the amount added of $Si_3N_4$ be up to 54% by weight, especially 20 to 54% by weight.

EXAMPLE 2

Figure 7:
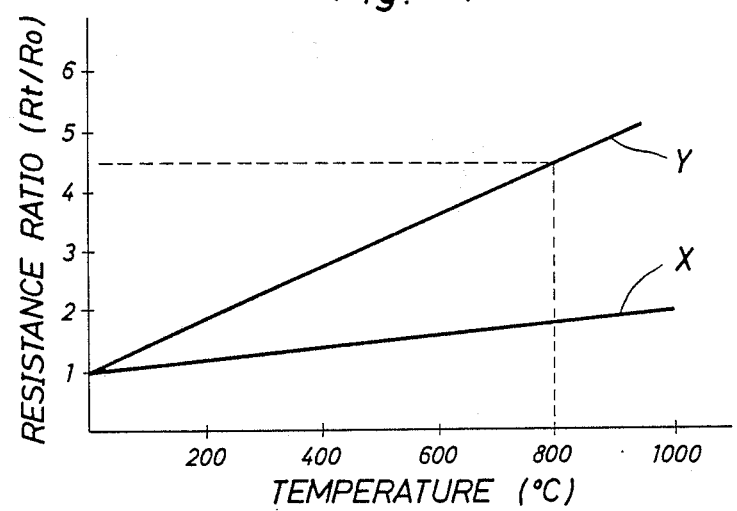
FIG. 7 is a graph illustrating the resistance temperature coefficients (TCR) of a comparative heater Y comprising a tungsten resistor formed on an alumina substrate and a heater X of the present invention (Example 2).

With respect to each of sample No. 2 (X) shown in Table 1 and a heater (Y) prepared in the same manner as described in Example 1 except that alumina ($Al_2O_3$) was used as the ceramic substrate and a tungsten (W) paste was used for the heat-generating resistor, the voltage was changed while measuring the top end of the heat-generating resistor of the heater, and the relation between the temperature and the resistance value was examined. In FIG. 7, the ratio of the resistance value to the resistance value at room temperature is plotted on the ordinate and the temperature was plotted on the abscissa. As is apparent from FIG. 7, it is understood that although the resistance temperature coefficient (TCR) of the $Al_2O_3$ system (Y) is $4.4\times10^{-3}$, the resistance temperature coefficient (TCR) of the $Si_3N_4$-TiN system (X) according to the present invention was smaller and $1.1\times10^{-3}$. This means that according to the present invention, the inrush current can be reduced as pointed out hereinbefore, and the temperature distribution hardly undergoes the influence of the external atmosphere.

Incidentally, in Examples 1 and 2, the TiN-containing heat-generating resistor was embedded in the silicon nitride sintered body. However, the present invention is not limited to this feature. Namely, there may be adopted a method in which the above-mentioned heat-generating resistor is arranged on the surface of the silicon nitride sintered body and, according to need, a covering composed of a ceramic material is formed, whereby a ceramic heater is formed.

Moreover, a heater may be formed by embedding a linear or plate-shaped heat-generating resistor in a silicon nitride sintered body. In this embodiment, since the resistance value of the heating-generating resistor is relatively small, a ceramic heater having a large heat-generating capacity under a low voltage can be obtained.

EXAMPLE 3

A plate-shaped ceramic heater was prepared in the same manner as described in Example 1 except that $Si_3N_4$, $Y_2O_3$, MgO and $Al_2O_3$ were added in amounts shown in Table 3.

With respect to each of so-obtained ceramic heaters corresponding to samples Nos. 1 through 13 shown in Table 3, a voltage which would raise the temperature of the top end of the heat-generating resistor to 900° C. by 5 seconds' application was applied to the heater for 5 seconds, and the ceramic heater was forcibly cooled in air for 13 seconds. This operation was regarded as one cycle, and the initial resistance value and the resistance value after 1,000 cycles were measured. The resistance change ratio was examined, and the resistance temperature coefficient (TCR) at temperatures of from 0° to 800° C. was examined. During the production of each ceramic heater, the thickness of the heat-generating resistor at the paste-printing step was measured by a film thickness meter. The obtained results are shown in Table 3.

added, and in the remaining three samples, MgO was not added.

TABLE 4

| Sample | Composition (% by weight) | | | |
|---|---|---|---|---|
| | $Si_3N_4$ | TiN | $Y_2O_3$ | MgO |
| A1 | 42.9 | 53.1 | 2.0 | 2.0 |
| A2 | 44.9 | 53.1 | 2.0 | 0.0 |
| B1 | 34.1 | 62.8 | 1.5 | 1.6 |
| B2 | 35.7 | 62.8 | 1.5 | 0.0 |
| C1 | 26.0 | 71.8 | 1.0 | 1.2 |
| C2 | 27.2 | 71.8 | 1.0 | 0.0 |

TABLE 3

| Sample No. | Composition (% by weight) of Heat-generating Resistor | | | | | Resistance Value ($\Omega$) | TCR ($\times 10^{-3}$/°C.) | Linearity of TCR | Change of Resistance Value ($\Omega$) after 1,000 cycles | [change Ratio (%)] | thickness ($\mu$m) |
|---|---|---|---|---|---|---|---|---|---|---|---|
| | $Si_3N_4$ | TiN | $Y_2O_3$ | $Mg(OH)_2$ | $Al_2O_3$ | | | | | | |
| *1 | (70.7) | (26.2) | 2.0 | 1.1 | — | 4503 | 1.25 | observed | not elevated to 1200°C. | | 13 |
| 2 | 54.8 | 42.0 | 2.1 | 1.1 | — | 540 | 1.19 | observed | 542 | (0.3) | 14 |
| 3 | 43.8 | 53.1 | 2.0 | 1.1 | — | 190 | 1.20 | observed | 191 | (0.5) | 15 |
| 4 | 25.1 | 71.8 | 2.0 | 1.1 | — | 70 | 1.15 | observed | 72 | (2.8) | 16 |
| *5 | (19.6) | (77.3) | 2.0 | 1.1 | — | 45 | 0.65 | not observed | 78 | (73.3) | 13 |
| *6 | 44.9 | 53.1 | 2.0 | (0) | — | 175 | 0.64 | not observed | 290 | (65.7) | 12 |
| 7 | 43.9 | 53.1 | 2.0 | 1.0 | — | 189 | 1.21 | observed | 191 | (1.0) | 14 |
| 8 | 42.9 | 53.1 | 2.0 | 2.0 | — | 185 | 1.17 | observed | 183 | (1.0) | 14 |
| 9 | 33.9 | 53.1 | 2.0 | 6.0 | — | 205 | 0.90 | observed | 208 | (1.4) | 13 |
| *10 | 34.9 | 53.1 | 2.0 | (10.0) | — | 172 | 0.48 | not observed | 318 | (26.7) | 15 |
| 11 | 44.9 | 53.1 | — | 2.0 | — | 186 | 1.17 | observed | 188 | (1.0) | 13 |
| *12 | 42.9 | 53.1 | 2.0 | (0) | 2.0 | 193 | 0.72 | not observed | 242 | (25.3) | 12 |
| 13 | 40.9 | 53.1 | 2.0 | 2.0 | 2.0 | 184 | 1.18 | observed | 184 | (1.0) | 14 |

Note
Each of the asterisked samples is outside the scope of the present invention.

From the results shown in Table 3, the following can be seen. In sample No. 1 in which the amount added of $Si_3N_4$ exceeds the range specified in the present invention, the resistance value is too large, and the heat-generating resistor cannot be put into practical use. In sample No. 5 in which the amount added of TiN exceeds the range specified in the present invention, the thermal expansion coefficient of the resistor is larger than that of the $Si_3N_4$ substrate and hence, fine cracks are formed in the resistor by the thermal stress at the generation of heat. Therefore, the change of the resistance value is large and no linearity is obtained in the resistance temperature coefficient (TCR). Furthermore, in samples Nos. 6, 10 and 12 in which $Mg(OH)_2$ was not added or the amount added of $Mg(OH)_2$ exceeds 9% by weight, sintering is insufficient or the amount of the vitreous component becomes too large, and hence, cracks are readily formed in the resistor and the change of the resistance is large. Moreover, no linearity is obtained in the resistance temperature coefficient (TCR). In contrast, in samples Nos. 2 through 4, 7 through 9, 11 and 13, which fall within the scope of the present invention, the resistance change ratio is low and less than 3%, and a good linearity is obtained in the resistance temperature coefficient (TCR).

EXAMPLE 4

Figure 8:
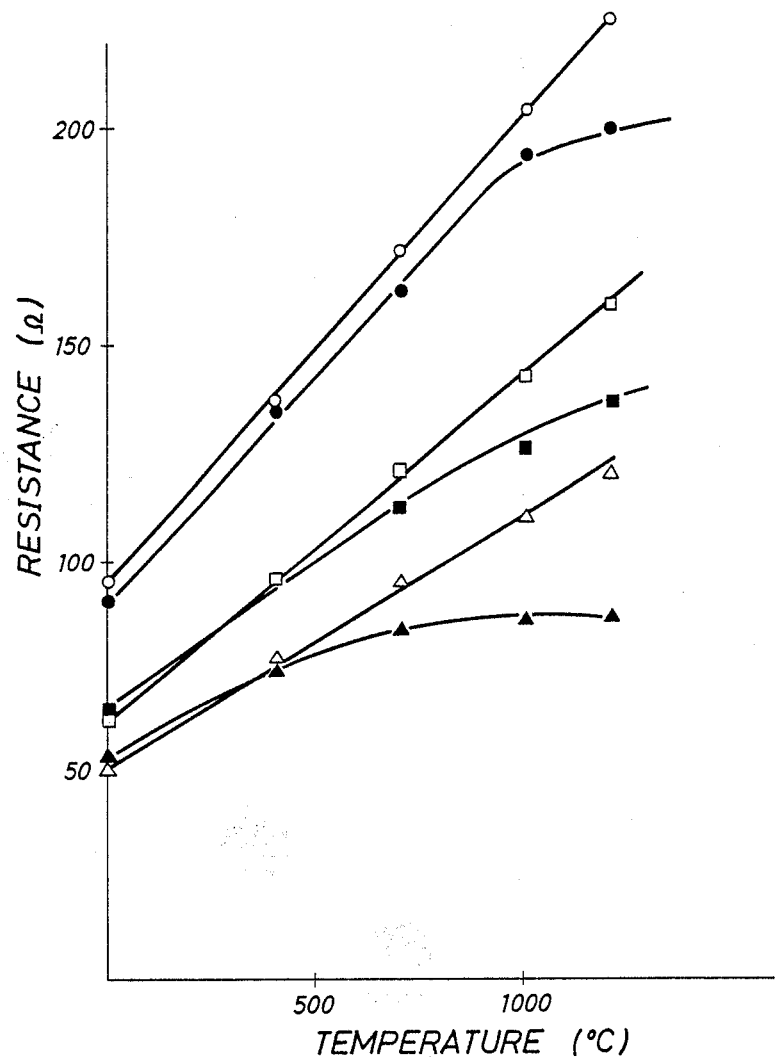
FIG. 8 is a graph illustrating in comparison the linearities of the resistance temperature coefficients (TCR) of an MgO-added resistor and an MgO-free resistor in Example 4 of the present invention.

Ceramic heaters as shown in FIG. 3 were prepared by resistor comprised $Si_3N_4$, TiN, $Y_2O_3$ and MgO in amounts shown A1, A2, B1, B2, C1 and C2 in Table 4 on the surfaces of silicon nitride substrate. In samples A1 and A2, the amount added of TiN was 53.1% by weight and in samples B1 and B2, the amount added of TiN was 62.8% by weight. Furthermore, in samples C1 and C2, the amount added of TiN was increased to 71.8% by weight. In the respective samples, substantially equal ratios between $Si_3N_4$ and $Y_2O_3$ as other additives were adopted. In three samples, MgO was With respect to these three pairs of samples, the change of the resistance value according to the temperature was examined. The obtained results are shown in FIG. 8. The resistance value was measured at room temperature, 400° C., 700° C., 1000° C. and 1200° C.

As is apparent from the results shown in FIG. 8, in samples A2, B2 and C2 in which MgO is not added, no linearity of the resistance temperature cannot be obtained at high temperatures. In contrast, in samples A1, B1 and C1, a good linearity of the resistance temperature coefficient is obtained. This means that if MgO is added, control of the temperature by generation of heat against the change of the resistance value according to the temperature can be easily performed.

EXAMPLE 5

Acetone and a binder were added to a commercially available WC powder (having a purity of 99.8%) and the mixture was blended by a shaking mill for 72 hours. Acetone was removed and the residue was kneaded, and the viscosity was adjusted to form a WC paste for a heat-generating resistor. The paste was screen-printed on a green silicon nitride formed body 1a obtained by press molding or tape formation, which would be rendered electrically insulating by sintering, to form a resistance circuit 2, as shown in FIG. 2. A green formed body 1a as described above was laminated on the resistance circuit-printed formed body and the laminate was integrally sintered according to any of the pressureless sintering method (PL), the gas pressure sintering method and the hot pressing method. Then, as shown in FIG. 3, the sintered body was subjected to a grinding or surface treatment to expose electrodes, and electrode-attaching fittings 3 were soldered to the electrodes through a metallized layer (not shown) to obtain a plate-shaped ceramic heater of 70 mm × 5 mm × 1.2 mm.

Comparative Sample 1

Acetone and a binder were added to a commercially available metallic W powder, and the mixture was blended by a shaking mill for 72 hours. Acetone was removed and the residue was kneaded, and the viscosity was adjusted to form a metallic W paste for a heat-generating resistor. In the same manner as described in Example 5, the paste was screen-printed on a green silicon nitride formed body obtained by press molding or tape formation, which would be rendered electrically insulating by sintering, to form a resistance circuit, and lamination and sintering were carried out in the same manner as in Example 5. The sintered body was subjected to a grinding or surface treatment to expose electrodes. Electrode-attaching fittings were soldered to the electrodes through a metallized layer and a ceramic heater was obtained in the same manner as described in Example 5.

Comparative Sample 2

A heat-generating filament of W having a diameter of 0.07 mm, which was connected to an external electrode take-out lead line, was embedded in a green formed body comprised a silicon nitride which would be rendered electrically insulating by sintering, and sintering was carried out by the hot press method, whereby a rod-shaped ceramic heater having the electrode take-out lead exposed to the outside was obtained.

Test 1

With respect to each of the sample of Example 5, Comparative Sample 1 and Comparative Sample 2, the resistance values of 10 specimens were measured at room temperature ($25 \pm 1°$ C.) by an ohmmeter, and the dispersion of the resistance values was examined. The obtained results are shown in FIG. 9.

Figure 9:
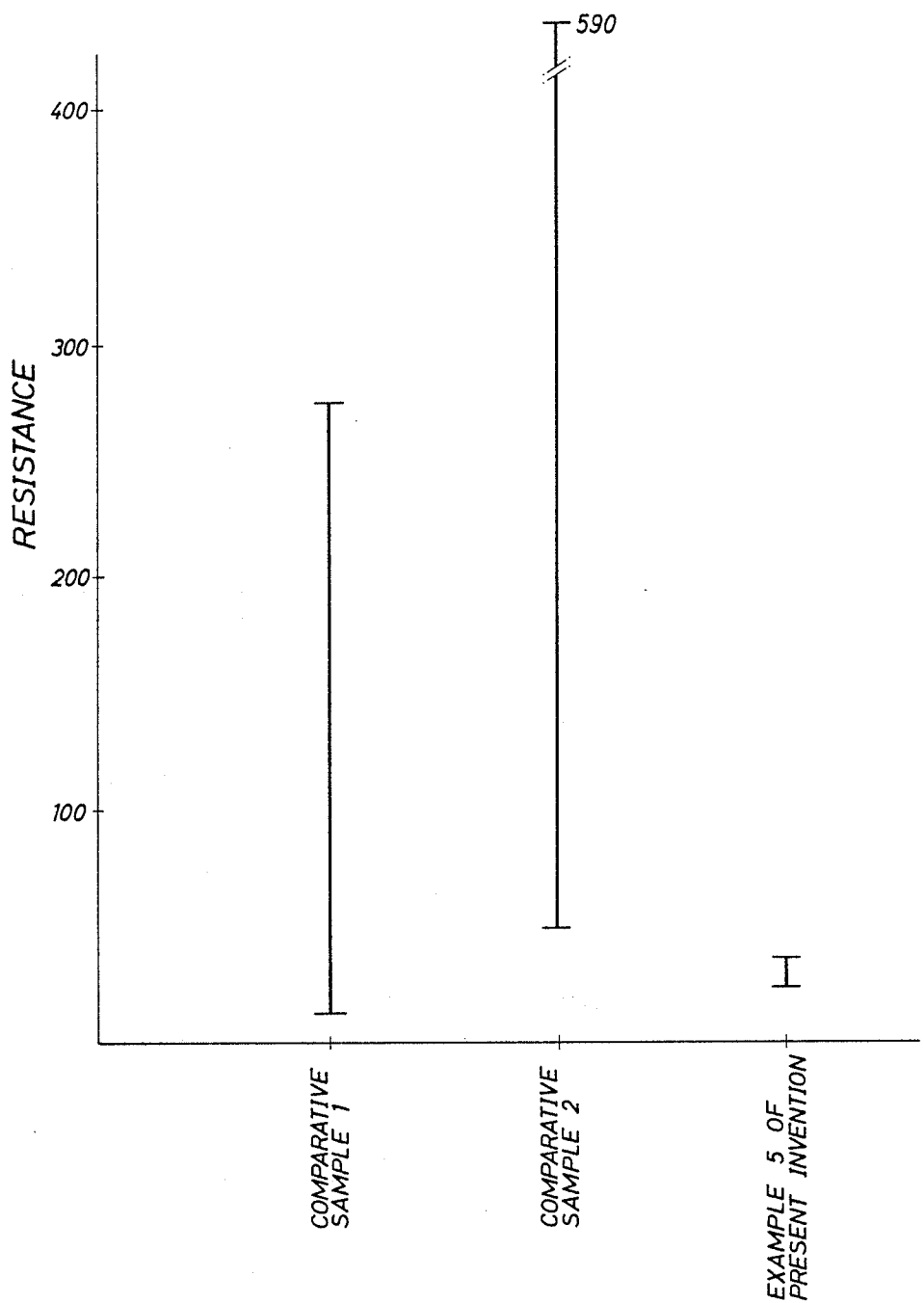
FIG. 9 is a graph illustrating the dispersion of the resistance of each sample in Example 5.

As is seen from the results shown in FIG. 9, in Comparative Sample 1 formed by using the paste of metallic W for a heat-generating resistor, the dispersion of the resistance values is very large and in the range of about 10 to about 275$\Omega$. In Comparative Sample 2 comprising the heat-generating resistor of the W filament, since the diameter of the heat-generating W filament is much reduced to 0.07 mm to compare the heater with the high-resistance heater of Example 5 according to the present invention, the influence of WSi is serious and the dispersion of the resistance values is large and in the range of about 50 to about 590$\Omega$. In contrast, in the sample of Example 5 according to the present invention, which is prepared by using a WC paste for a heat-generating resistor, the dispersion of the resistance values is in the range of about 25 to about 37$\Omega$ and much smaller than in Comparative Samples 1 and 2.

Test 2

With respect to each of the sample obtained in Example 5 and Comparative Examples 1 and 2, the voltage (V) and the current (I) were measured while measuring the temperature (T) at a position (highest heat-generating part) apart by a certain distance from the top end, and the relation between the resistance value (R) calculated according to the formula of $R = V/I$ and the temperature (T) was examined. The change of the resistance according to the temperature, thus determined, is shown in FIG. 10.

Figure 10:
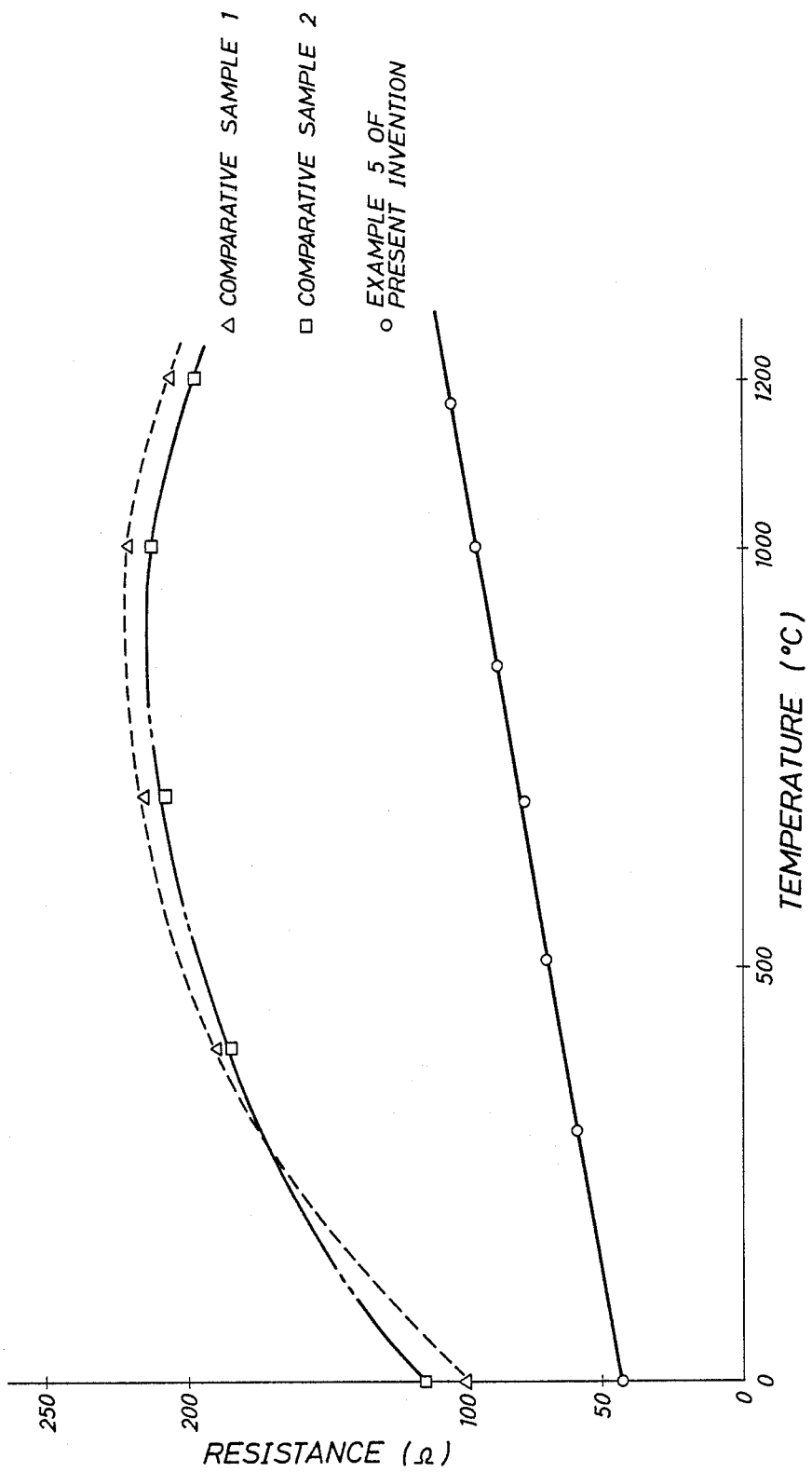
FIG. 10 is a graph illustrating the change of the resistance according to the temperature in each sample in Example 5.

As is understood from the results shown in FIG. 10, in Comparative Sample 1 prepared by a paste of metallic W for a heat-generating resistor and Comparative Sample 2 comprising a W filament as the heat-generating resistor, the change of the resistance value according to the temperature is expressed by a curve. On the other hand, in the sample of Example 5 prepared by using a WC paste for a heat-generating resistor according to the present invention, the change of the resistance value according to the temperature is expressed by a straight line.

Test 3

With respect to each of the sample obtained in Example 5 according to the present invention and Comparative Samples 1 and 2, the heat cycle test was carried out. In Comparative Samples 1 and 2, a voltage which would raise the temperature to 900° C. by 5 seconds' application was applied for 5 seconds and the ceramic heater was cooled in air for 20 seconds. This operation was regarded as one cycle, and this operation was repeated and the change of the resistance value was examined. The obtained results are shown in FIG. 11.

The sample of Example 5 according to the present invention was subjected to the heat cycle test under severer conditions than those adopted for Comparative Samples 1 and 2. Namely, a voltage which would raise the temperature to 1000° C. by 1 second's application was applied for 1 second, and the sample was cooled in air for 20 seconds. This operation was regarded as one cycle, and this operation was repeated and the change of the resistance value was examined. The obtained results are shown in FIG. 12.

Figure 11:
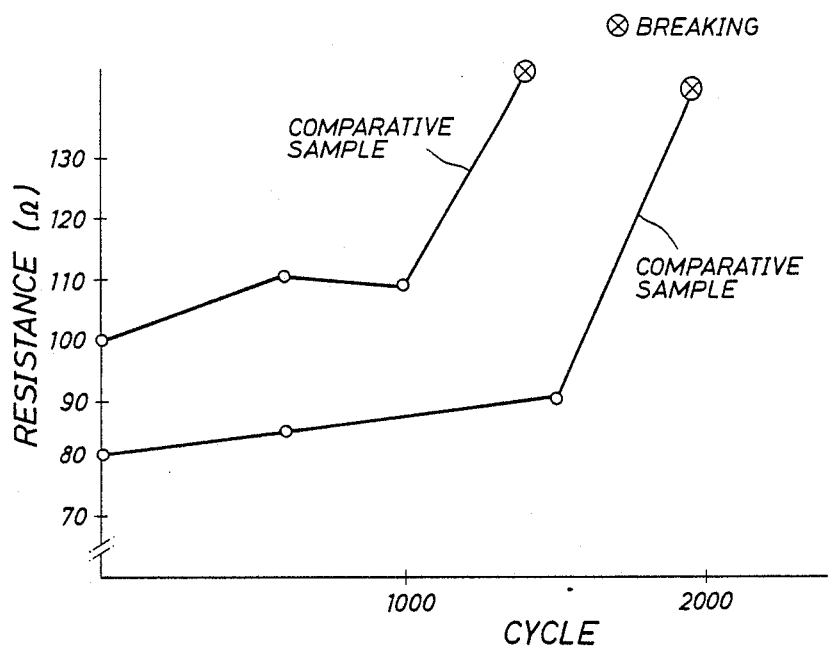
FIG. 11 and 12 are graphs illustrating the results of the heat cycle test of each sample in Example 5.
Figure 12:
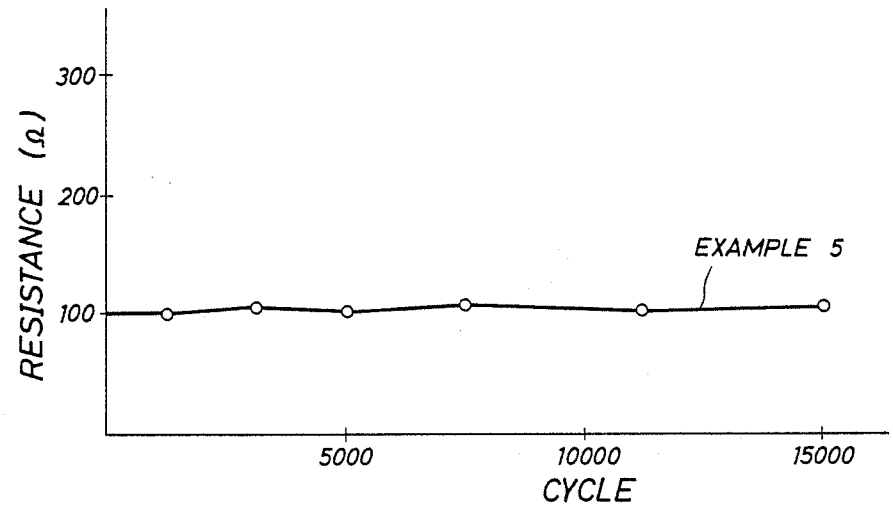

As is understood from the results shown in FIGS. 11 and 12, in Comparative Samples 1 and 2, the resistance value is increased till about 1000th cycle, but then, breaking is caused. On the other hand, in the sample of Example 5 according to the present invention, as shown in FIG. 12, even after 15000 cycles, the resistance value is not changed through the test conditions are severer than those adopted for Comparative Samples 1 and 2, and breaking is not caused at all.

EXAMPLE 6

Acetone and a binder were added to a titanium nitride (TiN) powder and the mixture was blended by a shaking mill for 72 hours. Acetone was removed, and the residue was kneaded and the viscosity was adjusted to form a heat-generating resistor paste composed mainly of TiN. As shown in FIG. 2, the so-obtained paste was screen-printed on a green alumina formed body 1a, which would be rendered electrically insulating by sintering, by a press molding or tape forming operation to form a resistance circuit 2. A green formed body 1b was laminated on the resistance circuit-printed formed body 1a, and the laminate was intergrally sintered according to any of the pressureless sintering method (PL), the gas pressure sintering method and the hot pressing method. The sintered body was subjected to a grinding or surface treatment to expose electrodes, and electrode-attaching fittings 3 are soldered to the electrodes through a metallized layer to form a plate-shaped ceramic heater of 70 mm × 5 mm × 1.2 mm, as shown in FIG. 3.

With respect to each of the so-obtained plate-shaped heaters corresponding to samples Nos. 1 through 3 shown in Table 5, a voltage (100 to 120 V) which would raise the temperature of the top end of the resistor to 900° C. by 5 seconds' application was applied to the top end of the heat-generating resistor for 5 seconds, and the ceramic heater was forcibly cooled in air for 13 seconds. This operation was regarded as one cycle. The initial value of the resistance and the resistance value after 20,000 cycles were measured, and the resistance change ratio was examined. The obtained results are shown in Table 5. During the production of each ceramic heater, the thickness of the heat-generating resistor at the paste-printing step was measured by a film thickness meter. The obtained results are shown in Table 5.

TABLE 5

| Sample No. | Substrate | Paste for Heat-generating Resistor | Sintering Method | Heat Cycle Test initial value (Ω) | after 20,000 cycles (Ω) | change ratio (%) | thickness (μm) |
|---|---|---|---|---|---|---|---|
| 1 | AlN | TiN | HP | 88 | 96 | 9.1 | 18 |
| 2 | AlN | TiN | PL | 83 | 86 | 3.6 | 21 |
| 3 | AlN | TiN | GPS | 84 | 87 | 3.6 | 20 |

From the results shown in Table 5, it is seen that a ceramic heater obtained by sintering a heat-generating resistor paste containing TiN according to the present invention, the change of the resistance value after 20,000 cycles is extremely small. This means that the above-mentioned brittle reaction layer is not formed in the interface between the resistor and aluminum nitride.

Figure 13:
FIG. 13 is a microscope photograph (5000 magnifications) showing the TiN layer and the portion surrounding the interface thereof in an aluminum nitride sintered body.

In connection with this fact, from the microscope photograph of FIG. 13 showing the section of the heater, it is seen that no reaction phase is present in the interface between the TiN layer shown as the central longitudinal line and the AlN substrate on the left or right side of the TiN layer, and a beautiful bonding state of TiN is obtained.

Appropriate amounts of the same AlN as that of the substrate and other additives such as $Y_2O_3$, MgO, $Al_2O_3$, Ni and Cr may be added to the heat-generating resistor paste composed mainly of TiN as the sintering aid or for controlling the resistance value.

In this case, if the amount of TiN is too small (for example, smaller than 45% by weight), the change of the resistance value is large as shown in FIG. 4 and it is difficult to set the control value.

EXAMPLE 7

With respect to each of Sample No. 2 shown in Table 5 and a heater prepared in the same manner as described in Example 6 except that alumina ($Al_2O_3$) was used as the ceramic substrate and a paste of tungsten (W) was used for the heat-generating resistor, the voltage was changed while measuring the temperature of the top end of the heater, and the relation between the temperature and the resistance value was examined.

It was found that although the resistance temperature coefficient (TCR) of the $Al_2O_3$-W system was $4.4 \times 10^{-3}$, the resistance temperature coefficient (TCR) of the AlN-TiN system according to the present invention is smaller and $2.5 \times 10^{-3}$.

EXAMPLE 8

Methanol and a binder were added to a composition shown in Table 6, and the mixture was blended by a shaking mill for 72 hours. Methanol was removed, and in case of samples Nos. 1, 5, 7, 9, 11 and 12, the residue was press-molded under a pressure of 1 ton/cm$^2$ and sintered at 1810° C. for 20 minutes in a nitrogen atmosphere. In case of samples Nos. 2 through 4, 6, 8 and 10, the residue was filled in a hot press mold and sintered at 1810° C. for 20 minutes in a nitrogen atmosphere according to the hot pressing method. In each case, a test piece of about 42 mm × 3.7 mm × 1.6 mm was obtained.

With respect to each of the so-obtained test pieces, the specific resistance was measured according to the four-terminal method and the density was measured by the Archimedes method. The crystal phase in the sintered body of each test piece was identified according to the X-ray diffractometry. Furthermore, by the X-ray microanalyzer (XMA) and the fluorescence X-ray analysis, it was confirmed whether or not Si of SiC was present in the sintered body. The obtained results are shown in Table 6.

TABLE 6

| Sample[1] No. | Composition (% by weight) TiN | SiC | Sintering[2] Method | Crystal Phase of Sintered Body | Specific Resistance (Ω-cm) | Density (g/cm$^3$) | Si in[3] Sintered Body |
|---|---|---|---|---|---|---|---|
| 1* | 100 | (0) | PL | TiN + Ti | (46.5) | 4.22 | absent |
| 2 | 99.95 | 0.05 | HP | TiN | 22.8 | 5.25 | absent |
| 3 | 99.5 | 0.5 | HP | TiN | 21.5 | 5.29 | absent |
| 4 | 99.0 | 1.0 | HP | TiN | 19.4 | 5.27 | absent |
| 5 | 98.5 | 1.5 | PL | TiN | 25.9 | 4.52 | absent |
| 6 | 97.5 | 2.0 | HP | TiN | 20.8 | 5.21 | absent |
| 7 | 95.0 | 5.0 | PL | TiN | 32.0 | 4.35 | absent |
| 8 | 95.0 | 5.0 | HP | TiN | 26.4 | 5.09 | absent |
| 9 | 92.5 | 7.5 | PL | TiN | 39.0 | 4.25 | absent |
| 10 | 92.5 | 7.5 | HP | TiN | 31.3 | 5.04 | absent |
| 11* | 90.0 | (10.0) | PL | TiN + indefinite phase | (46.8) | (4.06) | present |
| 12* | 85.0 | (15.0) | PL | TiN + α-SiC | (66.1) | (3.69) | present |

Note
(1) Each of asterisked samples is outside the scope of the present invention.
(2) PL: sintering under atmospheric pressure, HP: hot press sintering
(3) Determined by XMA As is seen from the results shown in Table 6, in sample No. 1 composed solely of TiC without addition of SiC, densification is advanced so that the density is 4.22 g/cm$^3$, but the specific resistance is as high as 46.5 μΩ-cm. In samples Nos. 11 and 12 where SiC is added in an amount of 10.0 or 15.0% by weight, the density is lower than 4.06 g/cm$^3$ and densification is insufficient, and the specific resistance is 66.1 μΩ-cm and is too high. Accordingly, these samples are not suitable for attaining the objects of the present invention. Moreover, at the X-ray diffractometry of samples Nos. 11 and 12, an indefinite phase or α-SiC phase is determined as the crystal phase in addition to the TiN phase. Moreover, at the analysis by the X-ray microanalyzer, certain Si is detected.

In contrast, in samples Nos. 2 through 10, wherein SiC is incorporated in an amount of 0.05 to 7.5% by weight according to the present invention, the density is at least 4.25 g/cm$^3$ and the specific resistance is lower than 39.0 $\mu\Omega$-cm, and these samples are suitable for attaining the objects of the present invention.

When these samples are analyzed by the X-ray diffractometry, it is seen that the crystal phase is composed substantially solely of the TiN phase, and by the analysis using the X-ray microanalyzer, Si is not detected. However, by the fluorescence X-ray analysis, the presence of Si is confirmed. In view of the foregoing, it is understood that added SiC is substantially solid-dissolved in the TiN lattice and that such a sintered body is sufficiently densified and the specific resistance is lower than 40 $\mu\Omega$-cm.

EXAMPLE 9

Acetone, a binder and a dispersant were added to a TiC powder of sample No. 4 or 5 shown in Table 6, which contained 1.0 or 1.5% by weight of SiC, and the mixture was blended by a shanking mill for 72 hours. Acetone was removed, and the residue was kneaded and the viscosity was adjusted to prepare a heat-generating resistor paste composed mainly of TiN. The paste was screen-printed on a green AlN or Si$_3$N$_4$ formed body 1a prepared by a press molding or tape forming operation, which would be rendered electrically insulating by sintering, to form a resistance circuit 2, as shown in FIG. 2. A green sheet 1b as described above was laminated on the resistance circuit-formed sheet, and the laminate was integrally sintered according to any of the pressureless sintering method (PL), the gas pressure sintering method and the hot pressing method. The sintered body was subjected to a grinding or surface treatment to expose electrodes, and electrode-attaching fittings 3 were soldered to the electrodes through a metallized layer to form a plate-shaped ceramic heater of 70 mm×5 mm×1.2 mm, as shown in FIG. 3.

With respect to each of the so-obtained plate-shaped ceramic heaters corresponding to samples Nos. 4 and 5, a voltage (100 to 120 V) which would raise the temperature of the top end of the heat-generating resistor to 900° C. by 5 seconds' application, was applied for 5 seconds, and the heater was forcibly cooled in air for 13 seconds. This operation was regarded as one cycle. The initial resistance value and the resistance value after 20,000 cycles were measured, and the resistance change ratio was examined. The obtained results are shown in Table 7.

TABLE 7

| Sample No. | Sub-strate | Resistor Paste (% by weight) | Sintering Method | Resistance Value ($\Omega$) initial value | Resistance Value ($\Omega$) after 20,000 cycles |
|---|---|---|---|---|---|
| 4 | AlN | TiN(98.5), SiC(1.5) | PL | 44 | 46 |
| 5 | Si$_3$N$_4$ | TiN(99.0), SiC(1.0) | HP | 35 | 38 |

From the results shown in Table 7, it is seen that in a ceramic heater obtained by sintering a heat-generating resistor paste comprising TiN as the main component and containing SiC, the resistance value is hardly changed even after 20,000 cycles.

Furthermore, the temperature resistance coefficient (TCR, 0° to 800° C.) of a TiN resistor containing 0.05 to 8% by weight, obtained in a manner as described above, is not substantially different from that of a resistor composed solely of TiN and is in the range of from about $1 \times 10^{-3}$ to about $2 \times 10^{-3}$. In the present invention, the so-prepared TiN resistor can be used as a conductor having a resistance lower than 40 $\mu\Omega$-cm.

EXAMPLE 10

A resistor paste composition shown in Table 8 was printed on a green silicon nitride sheet 1a at parts on which a heat-generating portion 4 and an electrode take-out lead portion 5 would be formed, and a similar green silicon nitride sheet 1b was laminated on the printed sheet 1a and the laminate was integrally sintered. The side face of the obtained sintered body was subjected to a polishing or surface treatment to sufficiently expose an electrode take-out exposed portion 6. A metallized layer 7 composed of a powdery mixture of glass and Ni was formed on the exposed portion 6, and a metal cap 9 having an electrode lead 8 is secured onto the metallized layer 7 through a silver solder 10.

Each of the obtained samples was a plate-shaped ceramic heater of 40 mm×5 mm×1.2 mm. The initial resistance value was measured. Then, a voltage (100 to 120 V) which would raise the temperature of the top end of the heater to 1300° C. was continuously applied for 100 hours, and the resistance value was measured. The resistance change ratio was examined. Furthermore, when the temperature of the top end of the ceramic heater was 1300° C., the temperature of the part surrounding the electrode take-out exposed portion 6 was examined. The obtained results are shown in Table 8.

TABLE 8

| Sample | Paste | Resistor Paste Composition (% by weight) | Resistance Values Before and After Continuous Application of Voltage and Change Ratio initial value ($\Omega$) | after 100 hours ($\Omega$) | change ratio (%) | Temperature (°C.) of Part Surrounding Electrode Take-out Exposed Portion |
|---|---|---|---|---|---|---|
| present invention | heat-generating portion lead portion | TiN(53.1) Y$_2$O$_3$(9.2) MgO(8.5) WC(100) | 73 | 73 | 0 | 150 |
| Comparative Sample 1 | heat-generating portion | TiN(53.1), Si$_3$N$_4$(40.8) Al$_2$O$_3$(4.1) Y$_2$O$_3$(2.0) | 78 | breaking (electrode take-out exposed portion) | 1.3 | 600 |
| | lead portion | TiN(53.1) Si$_3$N$_4$(40.8) Al$_2$O$_3$(4.1) Y$_2$O$_3$(2.0) | | | | |
| Comparative Sample 2 | heat-generating portion | tungsten: W(100) tungsten: W(1000 | 105 | breaking (heat- | — | — |

TABLE 8-continued

| Sample | Paste | Resistor Paste Composition (% by weight) | Resistance Values Before and After Continuous Application of Voltage and Change Ratio | | | Temperature (°C.) of Part Surrounding Electrode Take-out Exposed Portion |
|---|---|---|---|---|---|---|
| | | | initial value (Ω) | after 100 hours (Ω) | change ratio (%) | |
| | lead portion | | | generating portion). | | |

As is seen from the results shown in Table 8, in the case where the heat-generating portion and the lead portion are formed from the same TiN resistor paste, after continuous application (100 hours) of the voltage, peeling is caused in the interface between the electrode take-out portion and the metallized layer in the electrode take-out exposed portion and therefore, breaking is caused. It is considered that the reason is that since the temperature of the part surrounding the electrode take-out exposed portion was elevated to 600° C. when the top end of the heater is heated to 1300° C. by generation of heat, the electrode take-out exposed portion is corroded by oxidation. Moreover, in the case where the heat-generating portion and the lead portion are formed from the same tungsten (W) resistor paste, during continuous application of the voltage (100 hours), breaking is caused in the pattern of the heat-generating portion. It is considered that the reason is that at the intergral heating step or during continuous application of the voltage, tungsten (W) as the resistor reacts with the Si component in the silicon nitride sintered body to form a brittle $WSi_2$ layer and cracks are formed in the reaction layer-formed interface.

In contrast, in the case where a TiN resistor paste is used for the heat-generating portion and a WC resistor paste is used for the electrode lead portion according to the present invention, even after continuous application of the voltage for 100 hours, the resistance value is not changed, and the temperature of the part surrounding the electrode take-out exposed portion is as low as 150° C. when the top end of the heater is heated by generation of heat. Accordingly, the bonding state between the electrode take-out exposed portion and the metal cap of the electrode lead line is not influenced but good bonding is maintained.

We claim:

1. A ceramic heater comprising a ceramic substrate, a heat-generating resistor disposed in the interior of the ceramic substrate or on the surface of the ceramic substrate and terminals connected to both ends of the heat-generating resistor, wherein the ceramic substrate consists essentially of a sintered body of a nitride of an element selected from the group consisting of silicon and aluminum and the heat-generating resistor comprises a ceramic layer containing titanium nitride (TiN) or tungsten carbide (WC).

2. A ceramic heater as set forth in claim 1, wherein said heat-generating resistor comprises a paste layer containing titanium nitride (TiN) or tungsten carbide (WC) applied in a predetermined pattern on a green sheet of the ceramic substrate and subsequently sintered.

3. A ceramic heater as set claim 1, wherein the heat-generating resistor has a resistance temperature coefficient (TCR) of $1 \times 10^{-3}$ to $2 \times 10^{-3}$.

4. A ceramic heater as set forth in claim 1, wherein the heat-generating resistor layer comprises terminal-attaching portions having a large sectional area and a heat-generating intermediate portion having a small sectional area, which is located between the terminal-attaching portions.

5. A ceramic heater as set forth in claim 1, wherein the ceramic substrate is a sintered body of silicon nitride ($Si_3N_4$) and the heat-generating resistor layer is a ceramic layer containing titanium nitride (TiN).

6. A ceramic heater as set forth in claim 5, wherein the heat-generating resistor layer comprises a sintered body comprising (a) titanium nitride, (b) silicon nitride and (c) a sintering aid.

7. A ceramic heater as set forth in claim 6, wherein the sintering aid is selected from the group consisting of yttria, magnesia and alumina.

8. A ceramic heater as set forth in claim 6, wherein titanium nitride is present in an amount of 40 to 85% by weight, silicon nitride is present in an amount of 20 to 54% by weight and the sintering aid is present in an amount of 1 to 10% by weight.

9. A ceramic heater as set forth in claim 5, wherein the heat-generating resistor layer is a sintered body of a composition comprising titanium nitride and silicon carbide in an amount of 0.05 to 8% by weight based on titanium nitride, the sintered body has a chemical structure in which at least a part of SiC is solid-dissolved in the TiN lattice, and the sintered body has a density of at least 4.2 g/cm$^3$ and a specific resistance lower than 40 $\mu\Omega$-cm.

10. A ceramic heater as set forth in claim 5, wherein the heat-generating resistor layer is a sintered body of a composition comprising 20 to 70% by weight of $Si_3N_4$, 30 to 75% by weight of a sintering aid comprising TiN and 0.1 to 9% by weight of MgO or a compound to be converted to MgO under sintering conditions.

11. A ceramic heater as set forth in claim 1, wherein the ceramic substrate is a sintered body of aluminum nitride and the heat-generating resistor layer is a ceramic layer containing titanium nitride.

12. A ceramic heater as set forth in claim 1, wherein the ceramic substrate is a sintered body of silicon nitride and the heat-generating resistor layer is a tungsten carbide layer.

13. A ceramic heater comprising a ceramic substrate, a heat-generating resistor disposed in the interior of the ceramic substrate or on the surface of the ceramic substrate and terminals connected to both ends of the heat-generating resistor, wherein the ceramic substrate consists essentially of a sintered body of a nitride of an element selected from the group consisting of silicon and aluminum, the heat-generating resistor comprises terminal-attaching portions having a large sectional area and a heat-generating intermediate portion having a small sectional area, which is located between the terminal-attaching portions, the terminal-attaching portions comprise a ceramic layer containing tungsten carbide, and the heat-generating intermediate portion comprises a ceramic layer containing titanium nitride.

14. A ceramic heater comprising a ceramic substrate, a heat-generating resistor disposed in the interior of the ceramic substrate or on the surface of the ceramic substrate terminals connected to both ends of the heat-generating resistor, wherein the ceramic substrate is a sintered body of silicon nitride and the heat-generating resistor is a sintered ceramic layer comprising titanium nitride in an amount of 40 to 85% by weight, silicon nitride in an amount of 20 to 54% by weight and a sintering aid in an amount of 1 to 10% by weight.

15. A ceramic heater as set forth in claim 14, wherein the sintering aid is selected from the group consisting of yttria, magnesia and alumina.

16. A ceramic heater comprising a ceramic substrate, a heat-generating resistor disposed in the interior of the ceramic substrate or on the surface of the ceramic substrate and terminals connected to both ends of the heat-generating resistor, wherein the ceramic substrate is a sintered body of silicon nitride and the heat-generating resistor is a ceramic layer comprising titanium nitride and silicon carbide in an amount of 0.05 to 8% by weight based on titanium nitride, the sintered body has a chemical structure in which at least a part of SiC is solid-dissolved in the TiN lattice, and the sintered body has a density of at least 4.2 g/cm$^3$ and a specific resistance lower than 40 $\mu\Omega$-cm.

* * * * *